(12) United States Patent
Salgues et al.

(10) Patent No.: US 12,413,063 B2
(45) Date of Patent: Sep. 9, 2025

(54) ENHANCED CABLE SUPPORT ELEMENT, CABLE SUPPORT ASSEMBLY, AIRCRAFT ELECTRICAL SYSTEM AND AIRCRAFT

(71) Applicant: Airbus Operations (S.A.S.), Toulouse (FR)

(72) Inventors: Patrick Salgues, Toulouse (FR); Sylvain Carrere, Toulouse (FR); Benjamin Thubert, Toulouse (FR); Julien Hervier, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 18/421,100

(22) Filed: Jan. 24, 2024

(65) Prior Publication Data

US 2024/0322544 A1  Sep. 26, 2024

(30) Foreign Application Priority Data

Jan. 24, 2023 (FR) ....................................... 2300655

(51) Int. Cl.
  *H02G 3/32* (2006.01)
(52) U.S. Cl.
  CPC ..................... *H02G 3/32* (2013.01)
(58) Field of Classification Search
  CPC ............ H02G 3/30; H02G 3/045; H02G 3/32; H02G 3/04; F16M 3/137; F16M 3/1211; F16B 2/08; B60R 16/0215
  See application file for complete search history.

(56) References Cited

U.S. PATENT DOCUMENTS

| | | | | |
|---|---|---|---|---|
| 3,099,054 A | * | 7/1963 | Spiro | F16L 3/1236 248/74.3 |
| 4,153,228 A | * | 5/1979 | Delserro | F16L 3/123 24/19 |
| 5,354,021 A | * | 10/1994 | Farrell | F16L 3/233 248/74.5 |

(Continued)

FOREIGN PATENT DOCUMENTS

EP  723084 B1 * 7/2002 ............... B25B 5/08

OTHER PUBLICATIONS

French Search report for Application No. 2300655 dated Jul. 13, 2023.

*Primary Examiner* — Daniel J Troy
(74) *Attorney, Agent, or Firm* — KDW Firm PLLC

(57) ABSTRACT

A cable support includes an open annular body and two jaws secured to the open annular body and extending therefrom, arranged with one facing the other to form a clamp, the open annular body having an aperture. The aperture of the annular body is configured to allow insertion of at least one cable into the annular body. The terminal parts of the open annular body bordering the aperture each have a loop configured for passage of a self-locking clamping collar around the open annular body. The clamp-forming jaws each include at least one through aperture configured for the passage of a fixing structure that can be locked in position. A fixing assembly includes a cable support and an intermediate fixing support of the cable support. It is advantageously possible to carry out a fast and reliable installation of cables, notably in cramped spaces such as on board an aircraft.

20 Claims, 5 Drawing Sheets

(56) References Cited

U.S. PATENT DOCUMENTS

| | | | | |
|---|---|---|---|---|
| 5,680,680 A | * | 10/1997 | LaConte | B64C 1/403 24/297 |
| 6,257,530 B1 | * | 7/2001 | Tsai | F16L 3/127 248/74.2 |
| 9,512,940 B2 | | 12/2016 | Blakeley | |
| 2011/0315823 A1 | | 12/2011 | Sabadie | |
| 2015/0125235 A1 | | 5/2015 | Benthien | |

* cited by examiner

ENHANCED CABLE SUPPORT ELEMENT, CABLE SUPPORT ASSEMBLY, AIRCRAFT ELECTRICAL SYSTEM AND AIRCRAFT

TECHNICAL FIELD

The disclosure herein relates to an element of cable support type configured to ensure that at least a portion of one or more cables is held in a determined position. The disclosure herein relates more particularly to a cable support or cable loom support element suitable for installing aircraft electrical or electronic circuits. The disclosure herein relates further to a fixing assembly comprising an underframe to which such a cable or cable loom support is fixed.

BACKGROUND

There are many systems for fixing and holding cables in position and they are produced in various ways depending on the nature of the equipment for which they are intended, and on the environment. Often, a guide of annular form in which one or more cables pass is screwed onto a tapped intermediate metal support, by at least one screw and a washer, and the intermediate support is then itself screwed onto a part of the equipment which receives the cabling. Sometimes, rivets are also used to fix the elements together. While such assemblies are shown to be solid and effective, the mounting operations are sometimes lengthy and require many movements and manipulations of tools which substantially extend the assembly time, which can be prejudicial in terms of productivity in the context of industrial applications.

The situation can be improved.

SUMMARY

One object of the disclosure herein is a fixing element that allows a fast and easy assembly of cabling, particularly in cramped places where many equipment items have to be interconnected reliably.

To this end, a cable support is proposed comprising an open annular body and two jaws secured to the open annular body and extending from the open annular body, arranged with one facing the other and configured to jointly form a clamp, the open annular body having an aperture configured to allow the insertion of at least one cable into the annular body, the cable support being such that:
- each of the two terminal parts of the open annular body bordering the aperture has a loop, which is configured for the passage of a self-locking clamping collar arranged around the open annular body, and which is arranged facing the loop of the other terminal part of the two terminal parts,
- each of the two clamp-forming jaws comprises at least one through aperture configured for the passage of a fixing structure(s) or device(s) that can be locked in position, the fixing structure being preferentially of self-locking clamping collar type or of cam cylinder type, and the aperture being arranged facing an identical aperture of the other jaw out of the two jaws.

Thus, it is advantageously possible to carry out a rapid and reliable installation of cables, notably in cramped places such as on board an aircraft.

Advantageously, at least one of the jaws has splines arranged on a face disposed facing the other jaw.

Also a subject of the disclosure herein is a cable support assembly comprising a cable support as described hereinabove and an intermediate support, the intermediate support comprising a base provided with fixing structure, a leg, and a terminal part configured to be at least partially inserted into and held between the jaws of the cable support, the terminal part having a through aperture configured to be disposed in the alignment of the through apertures of the jaws when the terminal part is inserted between the jaws, and arranged for the passage of the fixing element.

The cable support according to the disclosure herein can also comprise the following features, considered alone or in combination:
- The terminal part of the intermediate support has splines of forms complementing the splines arranged on a face of at least one of the jaws;
- The leg of the intermediate support has splines of forms complementing the splines of at least one of the jaws of the cable support;
- The leg and the base of the intermediate support are linked together by an articulated link, preferentially of pivot link type;
- The support assembly is manufactured in one or more thermoformed materials.

Also a subject of the disclosure herein is a cable support kit comprising a support assembly as mentioned above, and at least one self-locking fast clamping collar or a fixing element of cam cylinder type, configured to be inserted through the through apertures of the jaws and to hold the cable support and the intermediate support together.

Also a subject of the disclosure herein is an electrical or electronic system comprising a cable support or a cable support assembly as described hereinabove.

Finally, a subject of the disclosure herein is an aircraft comprising an electrical or electronic system comprising a cable support, a cable support assembly or a system as previously described.

BRIEF DESCRIPTION OF THE DRAWINGS

The features of the disclosure herein mentioned above, and others, will become more clearly apparent on reading the following description of an example embodiment, the description being given in relation to the attached drawings.

DETAILED DESCRIPTION

Figure 1:
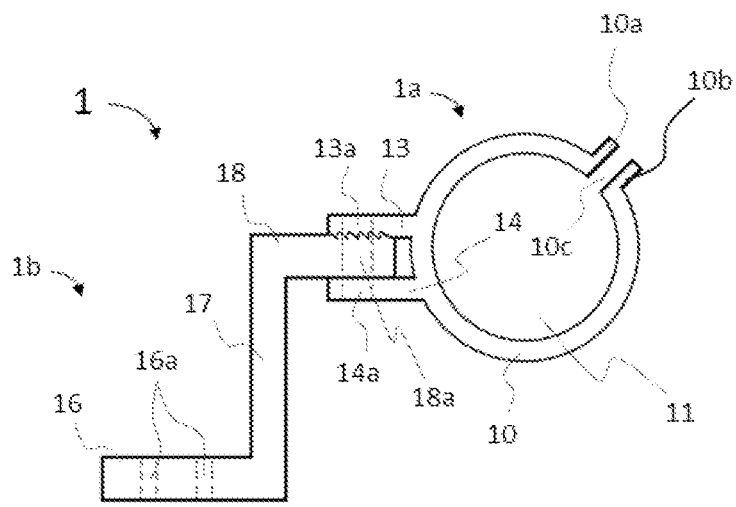
FIG. 1 schematically illustrates a cable support borne by an intermediate support according to an embodiment.

FIG. 1 is a schematic representation of a cable support assembly 1 (cable being understood as an electrical conductor) configured to support one or more cables. The cable support assembly comprises a cable support 1a and an intermediate support 1b serving as underframe for the cable support 1a. In the present description, the term "cable support" designates an element configured to bear, hold, fix, guide or position one or more cables according to a predefined placement or even to bear, hold, fix, guide or position a cable loom or bundle (that is to say a cable assembly, sometimes called "cabling", possibly structured in a certain way). The term "cable support assembly", for its part, designates a set of elements comprising a cable support as defined hereinabove and an intermediate support configured to itself support a cable support. Such an assembly can be included in a cable support kit further comprising accessory elements, such as one or more clamping collars, screw fastenings, et cetera. The intermediate support 1b is provided to hold the cable support 1a. Advantageously, the intermediate support 1b can be used to hold several cable supports similar to the cable support 1a. The intermediate support 1b is called intermediate support inasmuch as it provides a cable support support function.

The cable support 1a comprises an open annular body 10, that is to say a body in the form of an open ring or open cylinder. The terms "open ring" or "open cylinder" here designate a ring or a cylinder which is not completely closed, structured as a ring/cylinder from which a portion of ring/cylinder would have been removed, so as to be able to insert or remove an element into or out of the ring/cylinder. Hereinafter in the present description, the term ring will be used to more broadly designate a ring or cylinder form, or even a form substantially similar to a ring or to a cylinder. A free space (or even aperture or gap) 10c separates the two terminal parts of the open ring 10. A through aperture 11 constitutes the interior of the open ring 10. According to one embodiment, the open ring 10 is manufactured from a material which confers upon it a certain elasticity, so as to allow the edges of the aperture 10c to be separated from one another and the separation thereof to be increased to facilitate the insertion of a cable into the open ring 10 such that the cable is belted by the open ring 10 and then passes through the through aperture 11 of the open ring 10. When a cable is inserted into the open ring 10, it is then guided in position by the open ring 10, since the open ring 10 is itself held in a predetermined position. Advantageously, the elasticity of the open ring 10 allows its terminal parts disposed on either side of the aperture 10c to revert to their initial positions (before separation) after the insertion of one or more cables into the open ring 10. According to one embodiment, each of the terminal parts of the open ring comprises a loop of material configured for the passage of a self-locking clamping collar, sometimes known by the name of "Ty-rap" or "cable tie" collar. Thus, one of the terminal parts delimiting the aperture 10c comprises a loop of material 10a and the other of the terminal parts delimiting the aperture 10c comprises a loop of material 10b arranged facing the loop of material 10a. The loops 10a and 10b each form a protuberance. In other words, the loops do not extend according to the profile of the ring, but each form a lip, for example in a radial or substantially radial direction with respect to the ring. According to one embodiment, the open ring 10 shrewdly bears two jaws 13 and 14 extending radially or substantially radially with respect to it, outward, and parallel or substantially parallel to one another, thus forming a clamp configured to grip an external element inserted between the two jaws 13 and 14. According to one embodiment, the jaws 13 and 14 do not extend radially but extend parallel to one another, in the continuity of two parallel chords that are contained in the profile of the ring. Advantageously, the material used to manufacture the cable support 1a has a certain flexibility and elasticity allowing the jaws 13 and 14 operating as a clamp to exert, if necessary, a pressure on an element inserted between the two jaws 13 and 14 depending on the thickness of the element inserted between the two jaws 13 and 14, and facing the gap between the two jaws 13 and 14. According to one embodiment, the intermediate support 1b is configured to bear the cable support 1a and, to this end, has a base 16, a leg 17 and a terminal part 18, which terminal part is configured to be inserted between the jaws 13 and 14. According to one embodiment, the base 16 is configured to be fixed onto a support or substrate of flat or substantially flat form by virtue of fixing structure 16a, the leg 17 is at right angles or substantially at right angles to the base 16 and the terminal part 18 is parallel or substantially parallel to the base 16. This example is not however limiting and the intermediate support 1b can have any other form or configuration that is useful to an effective hold of the cable support 1a, or of several cable supports similar to the cable support 1a. According to one embodiment, the link between the base 16 and the leg 17 is an articulated link of pivot type. According to another embodiment, the link between the base 16 and the leg 17 is a link of ball joint type allowing the leg to be positioned according to two degrees of freedom. Advantageously, the articulated link implemented between the base 16 and the leg 17, if appropriate, has a friction force that is sufficiently great to allow the leg 17 to be held in position with respect to the base 16 without any force exerted on the leg 17, greater than a predetermined threshold. In other words, the articulated link is such that it is possible to manually apply a position-setting of the leg 17 with respect to the base 16, which setting then remains without any manipulation. According to one embodiment, the fixing structure for fixing the base 16 onto a flat or quasi-flat support are through apertures configured for the passage of a screw or a rivet. According to a variant embodiment, the fixing structure 16a comprises clips configured for assembly on elements of a form complementing the clips. According to yet another example, the fixing structure 16a comprises magnets made of neodymium. These examples are not however limiting. Advantageously, the jaws 13 and 14 operating as a clamp on the terminal part 18 of the intermediate support, and the terminal part itself, each comprise at least one aperture configured for the passage of a self-locking clamping collar. According to the example represented in FIG. 1, the jaw 13, the terminal part 18 and the other jaw 14 all three have a single aperture, and the three apertures are arranged so as to be aligned when the terminal part 18 of the intermediate support 1b is inserted between the jaws 13 and 14 of the cable support 1a. The jaw 13 comprises an aperture 13a; the jaw 14 comprises an aperture 14a and the terminal part 18 comprises an aperture 18a. Thus, it is possible to insert a single self-locking clamping collar via the aligned apertures 13a, 14a and 18a, as well as via the loops of material 10a and 10b respectively arranged on each of the terminal parts of the open ring 10. Such a configuration makes it possible to apply a good positioning of a cable inside the open ring 10, then closed by the clamping collar, and to hold the cable support 1a secured to the intermediate support 1b, by the effect of the same clamping collar.

According to a variant embodiment, the jaws 13 and 14 and the terminal part 18 can each comprise several apertures configured for the passage of a self-locking collar such that a first collar can be dedicated to a good closure of the open ring 10 around a cable inserted into the through aperture 11 and a second collar can guarantee a good hold of the cable support 1a in position on the intermediate support 1b.

Advantageously, the jaw 13 has splines on its "inner" face facing the jaw 14 to better grip the terminal part 18 when the latter is inserted between the jaws 13 and 14. More advantageously, the terminal part 18 has splines of forms complementing the forms of the splines of the jaw 13 and/or of the jaw 14 to apply a good hold of the terminal part 18 in position between the jaws 13 and 14. According to one embodiment, each of the jaws 13 and 14 has splines and the terminal part 18 has splines on only one of its faces or even on both of its faces.

According to one embodiment, the splines of the jaws 13 and 14 are arranged at right angles with respect to the direction in which the jaws extend from the open ring 10 forming the body of the cable support 1a. According to this example, the splines of the terminal part 18 extend at right angles to the direction in which the terminal part 18 extends from the end of the leg 17 opposite the base 16, such that the splines of the jaw or jaws and the splines of the terminal part 18 are parallel to one another, and therefore of complementary forms. Advantageously, the splines each have a triangular profile, allowing an easy insertion of the terminal part 18 while each serving as a non-return stop to facilitate the hold in position during mounting. Very clearly, this example embodiment is not limiting and other profiles of splines can be used (semi-circular, notched, et cetera).

Figure 2:
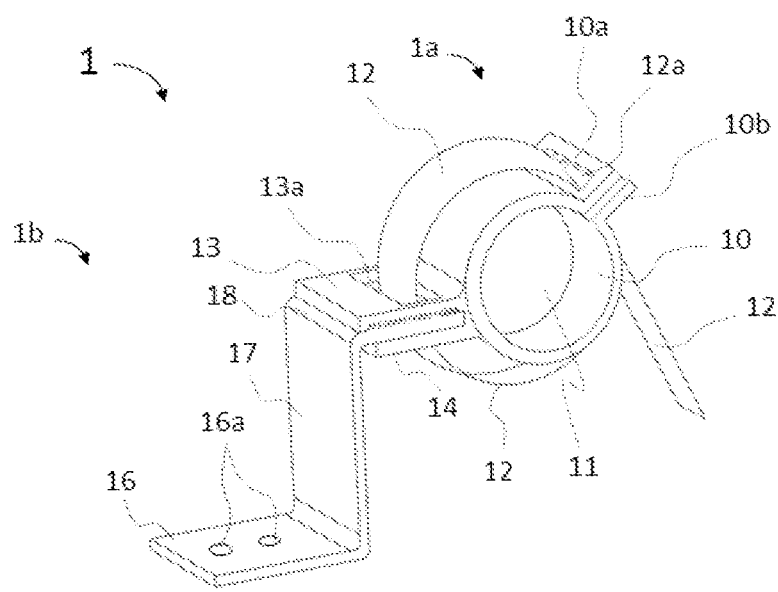
FIG. 2 is a perspective view of the cable support and of the intermediate support already represented in FIG. 1.
Figure 3:
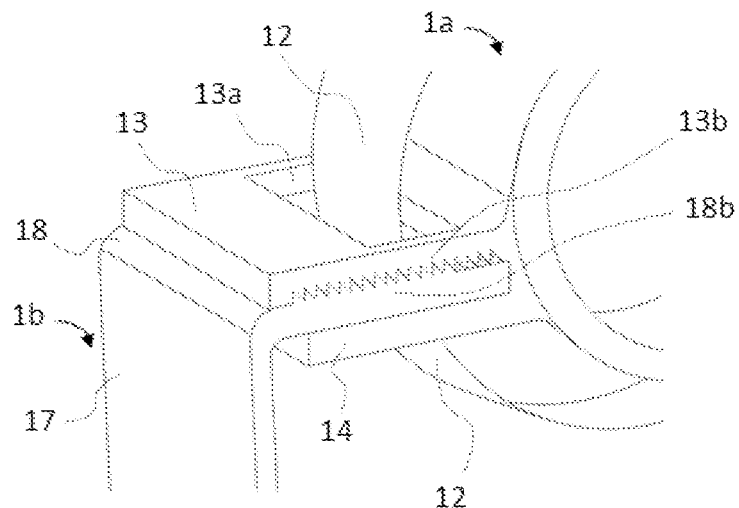
FIG. 3 is an enlargement of a part of the perspective view represented in FIG. 2.
Figure 4:
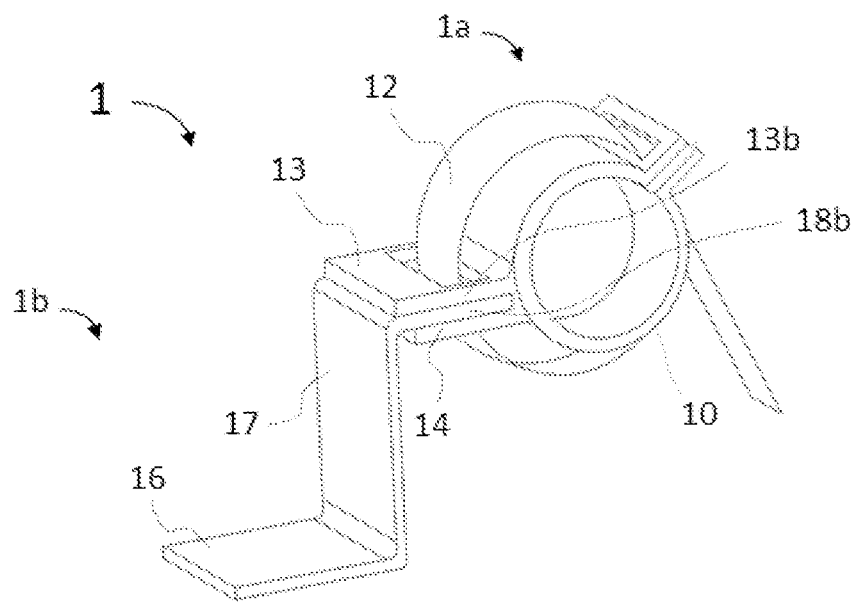
FIG. 4 schematically illustrates a variant embodiment of the assembly composed of the cable support and of the intermediate support, already represented in FIG. 1, FIG. 2 and FIG. 3.

FIG. 2 is a perspective view of the cable support assembly 1 composed of the cable support 1a and the intermediate support 1b. The assembly 1 is seen here with a clamping collar 12 inserted through the through apertures 13a, 14a and 18a and through the loops of material 10a and 10b, applying both a closure of the open ring 10 and a locking of the cable support 1a in position on the intermediate support 1b. FIG. 3 is an enlarged view of the portion of the assembly 1 illustrating in detail the positioning of the terminal part 18 of the intermediate support 1b between the jaws 13 and 14 of the cable support 1a. According to the example described, the jaw 13 has splines on its inner face facing the jaw 14, which splines are of forms complementing the splines of the terminal part 18. Depending on the gap between the jaws 13 and 14, in light of the thickness of the terminal part 18, the splines are not necessarily useful if the number of cables that the cable support 1a bears is reduced, and FIG. 4 illustrates an example embodiment in which the cable support 1a and the intermediate support 1b have no splines. Such a configuration does however apply a less precise hold in position between the cable support 1a and the intermediate support 1b than when there are splines.

Figure 5:
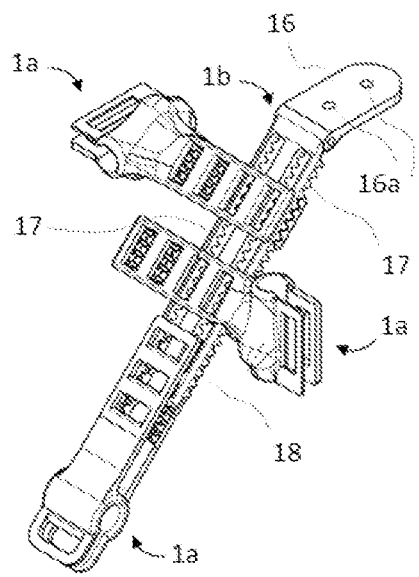
FIG. 5 illustrates schematically and in perspective an assembly of cable supports on a same intermediate support, according to an embodiment.

According to an embodiment illustrated in FIG. 5, the intermediate support 1b is configured to bear and hold several cable supports similar to the cable support 1a. According to this embodiment, the terminal part 18 is arranged so as to be aligned with the leg 17, the leg 17 has splines over its entire length, and the articulated link between the base 16 and the leg 17 is a pivot link. Advantageously, the cable support 1a can have splines of jaws in an orientation other than that described previously. For example, the splines of the jaws 13 and 14 can extend in a same direction as that in which the jaws 13 and 14 extend from the ring 10. That allows for an assembly of several supports 1a as is represented in FIG. 5, an assembly according to which a support element 1a extends in the longitudinal direction of the leg 17 of the intermediate support 1b and two other supports 1a extend at right angles to the leg 17 of the intermediate support 1b. Such an assembly is particularly advantageous for arranging crossings of cables or of cable looms, in an ordered fashion, and guaranteeing a good hold of the assembly in position. Quite clearly, other configurations of arrangement of splines of jaws 13 and 14 of a support 1a can be produced to obtain a greater variety of orientation of cables or of cable looms, with respect to one another.

Figure 6:
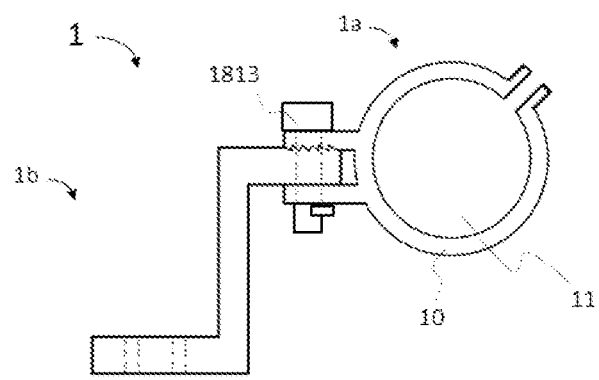
FIG. 6 schematically illustrates a fixing structure for fixing a cable support onto an intermediate support, according to an embodiment.

FIG. 6 illustrates an embodiment of the cable support assembly 1 according to which the cable support 1a is fixed to the intermediate support 1b by a fixing element of cam cylinder type. According to this embodiment, the through apertures 13a and 14a of the jaws 13 and 14 of the cable support 1a, as well as the through aperture 18a of the terminal part 18 of the intermediate support 1b, have a form of bore to which is added a square or rectangular cutout in the border of the bore to allow the passage of a cam cylinder 1813, and a rotation thereof after insertion through the three aligned apertures 13a, 14a and 18a.

Thus, the cam cylinder 1813 comprises a cylindrical body provided with a head 1813h that is wider than the body, configured to bear on the border of the aperture 13a or 14a of the jaw on which it bears after insertion and the end opposite the cam cylinder 1813, on the side opposite the head comprises a cam 1813c configured to bear on the border of the other of the apertures 13a and 14a of the jaws 13 and 14, after rotation of the cylindrical element 1813 in the three apertures 13a, 14a and 18a, thus applying a lock, such as a lock mechanism. Advantageously, this configuration allows a rapid and sure assembly of a cable support such as the cable support 1a on an intermediate support such as the intermediate support 1b. The head 1813h of the cam cylinder 1813 can comprise an imprint of a form complementing the form of a tool (screwdriver, wrench, et cetera) or be configured to be turned easily by a quarter-turn manually.

Figure 7:
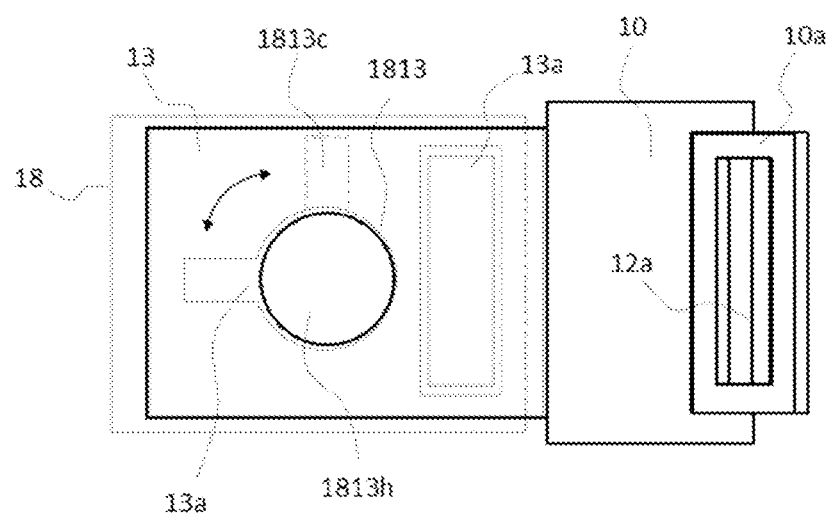
FIG. 7 is a partial view of the supports represented in FIG. 6 and illustrates details of the fixing structure between a cable support and an intermediate support; and, FIG. 8 illustrates an aircraft comprising a cable support or a cable support assembly, according to an embodiment.

FIG. 7 is a partial top view of the cable support 1a represented in FIG. 6 illustrating, by a bidirectional arrow, a rotation by a quarter-turn of the cam cylinder 1813 after insertion through the aligned apertures of the jaw 13, of the terminal part 18 and of the jaw 14 (not visible in FIG. 7). It should be noted that, according to the example embodiment represented here, the jaws 13 and 14 and the terminal part 18 each comprise two through apertures 13a. Thus, and still according to this example, a clamping collar can be used to close the open ring 12a and the cam cylinder 1813 is used for the fixing and the holding of the cable support 1a on the intermediate support 1b.

Figure 8:
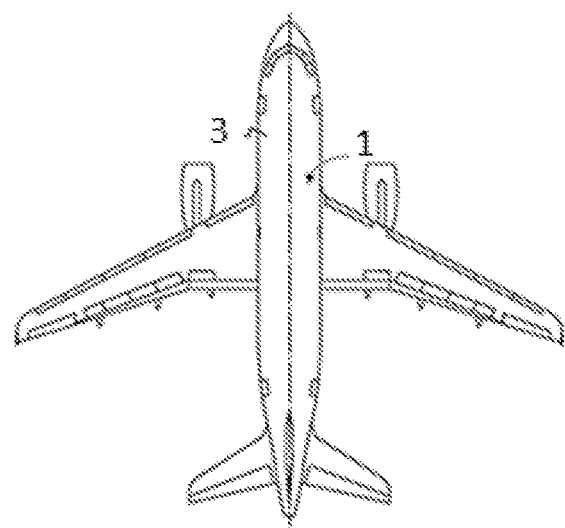

FIG. 8 represents an aircraft 3 comprising at least one cable support assembly 1. The use of such cable support assemblies in an aircraft advantageously makes it possible to facilitate the operations involved in mounting electrical and electronic systems, notably in cramped places, and thus to increase productivity. Advantageously, the cable support assembly 1 can be delivered in kit form, each kit comprising an intermediate support 1b, one or more cable supports 1a, one or more self-locking clamping collars, and/or one or more cam cylinders for the fixing of cable supports similar to the cable support 1a on an intermediate support similar to the intermediate support 1b. Such a kit can further comprise structure for fixing the base of the intermediate support onto a mechanical element offering a flat or substantially flat surface.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cable support assembly comprising:
a cable support comprising:
an open annular body comprising:
an aperture configured to allow insertion of at least one cable into the open annular body; and
two terminal parts that each border the aperture and each comprise a loop configured for passage of a self-locking clamping collar therethrough;
wherein the loop of one of the two terminal parts is arranged facing the loop of another terminal part of the two terminal parts; and
two jaws that:
are secured to the open annular body;
extend from the open annular body;
are arranged with one jaw of the two jaws facing another jaw of the two jaws; and
are configured to jointly form a clamp;
wherein each of the two jaws comprise at least one through aperture configured for passage of the self-locking clamping collar therethrough; and
wherein the at least one aperture of one jaw of the two jaws is arranged facing the at least one aperture of another jaw of the two jaws; and
an intermediate support comprising a base comprising:
a fixing structure;
a leg; and
a terminal part configured to be at least partially inserted and held between the jaws of the cable support;
wherein the terminal part has a through aperture that is, when the terminal part is inserted between the two jaws:
configured to be disposed in an alignment of the through apertures of the two jaws; and
arranged for the passage of the self-locking clamping collar therethrough.

2. The cable support assembly of claim 1, wherein at least one of the two jaws has splines arranged on a face disposed facing the other jaw of the two jaws.

3. The cable support assembly of claim 1, wherein the terminal part of the intermediate support has splines of forms complementing the splines arranged on a face of at least one of the jaws.

4. The cable support assembly of claim 1, wherein the leg of the intermediate support has splines of forms complementing the splines of at least one of the jaws of the cable support.

5. The cable support assembly of claim 1, wherein the leg and a base of the intermediate support are linked together by an articulated link.

6. The cable support assembly of claim 1, comprising one or more thermoformed materials.

7. A cable support kit comprising the cable support assembly of claim 1, and at least one self-locking fast clamping collar or a cam cylinder fixing element configured to be through the through apertures of the jaws and to securely hold the cable support and the intermediate support.

8. An electrical or electronic system comprising the cable support assembly of claim 1.

9. An aircraft comprising the electrical or electronic system of claim 8.

10. The cable support assembly of claim 1, wherein the at least one aperture of the one jaw of the two jaws is identical to the at least one aperture of the other jaw of the two jaws.

11. A cable support assembly comprising:
a cable support comprising:
an open annular body comprising:
an aperture configured to allow insertion of at least one cable into the open annular body; and
two terminal parts that each border the aperture and each comprise a loop configured for passage of a self-locking clamping collar arranged around the open annular body;
wherein the loop of one of the two terminal parts is arranged facing the loop of another terminal part of the two terminal parts; and
two jaws that:
are secured to the open annular body;
extend from the open annular body;
are arranged with one jaw of the two jaws facing another jaw of the two jaws; and
are configured to jointly form a clamp;
wherein each of the two jaws comprise at least one through aperture configured for passage of a cam cylinder that can be locked in position; and
wherein the at least one aperture of one jaw of the two jaws is arranged facing the at least one aperture of another jaw of the two jaws;
an intermediate support comprising a base comprising:
a fixing structure;
a leg; and
a terminal part configured to be at least partially inserted and held between the jaws of the cable support;
wherein the terminal part has a through aperture that is, when the terminal part is inserted between the two jaws:
configured to be disposed in an alignment of the through apertures of the two jaws; and
arranged for the passage of the cam cylinder therethrough.

12. The cable support assembly of claim 11, wherein at least one of the two jaws has splines arranged on a face disposed facing the other jaw of the two jaws.

13. The cable support assembly of claim 11, wherein the terminal part of the intermediate support has splines of forms complementing the splines arranged on a face of at least one of the jaws.

14. The cable support assembly of claim 11, wherein the leg of the intermediate support has splines of forms complementing the splines of at least one of the jaws of the cable support.

15. The cable support assembly of claim 11, wherein the leg and a base of the intermediate support are linked together by an articulated link.

16. The cable support assembly of claim 11, comprising one or more thermoformed materials.

17. A cable support kit comprising the cable support assembly of claim 11, and at least one self-locking fast clamping collar or a cam cylinder fixing element configured to be through the through apertures of the jaws and to securely hold the cable support and the intermediate support.

18. An electrical or electronic system comprising the cable support assembly of claim 11.

19. An aircraft comprising the electrical or electronic system of claim 18.

20. The cable support assembly of claim 11, wherein the at least one aperture of the one jaw of the two jaws is identical to the at least one aperture of the other jaw of the two jaws.

* * * * *